Feb. 11, 1964

J. D. RAMSEY 3,120,973

RESILIENT BUMPER FOR VEHICLES

Filed April 12, 1960

INVENTOR
Joseph D. Ramsey
BY
Munro H. Hamilton
ATTORNEY

3,120,973
RESILIENT BUMPER FOR VEHICLES
Joseph D. Ramsey, 19 Westland Road, Watertown, Mass.
Filed Apr. 12, 1960, Ser. No. 21,641
2 Claims. (Cl. 293—84)

This invention relates to an improved automobile bumper construction of the class in which a plurality of bumper sections are combined with one another in such a manner as to comprise a shock absorbing or cushioning device for softening impact forces, especially those developing out of bumper to bumper contact of two different vehicles.

In earlier devices known to the art, various arrangements have been proposed for softening or cushioning impact forces by means of spring-loaded mechanism which can be mounted in a vehicle in a position to yieldably sustain the impact forces. In all of these devices, so far as I am aware, a common difficulty has been the utilization of a considerable number of springs and lever components which are subject to wear and which are required to be displaced or compacted upon themselves throughout a relatively large distance. This increases the size of such bumper constructions undesirably rendering them cumbersome, unduly bulky, and expensive to install on a car.

It is a chief object of the invention to provide an improved bumper construction and to combine a plurality of resiliently supported bumper sections so that they are capable of absorbing relatively large impact forces within a very short displacement distance. Another object of the invention is to provide a bumper construction which is designed to operate with a single pair of springs which can be easily installed and maintained in an operative position.

Still another object of the invention is to devise a unique combination of lever arms and shackle members for cushioning impact forces.

These and other objects and novel features will be more fully understood and appreciated from the following description of a preferred embodiment of the invention selected for purposes of illustration and shown in the accompanying drawings, in which.

Figure 1:
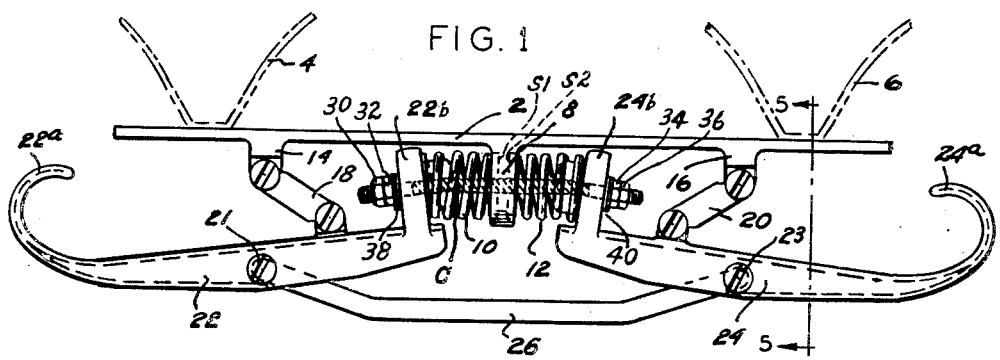
FIG. 1 is a plan view of the bumper construction of the invention shown in a fully extended position.

Referring more in detail to the drawings, numeral 2 denotes an elongated rigid frame piece which may, for example, consist of a steel bar of rectangular cross section and of a length suitable for extending across the front end or rear end of an automobile. It is intended that the frame piece 2 be secured to the body of an automobile in a raised position by means of suitable brackets or arms 4 and 6 indicated on broken lines in FIG. 1. As noted in FIG. 1 the frame piece 2 is formed with a central spring retaining body portion 8 having an opening axially formed therethrough. The spring retaining ring portion 8 is formed at either side thereof with ring shaped seats S1 and S2 in which are received respective coiled springs 10 and 12. These springs are located such that their axis of contraction and extension is substantially parallel to the inner surface of the frame piece 2.

Also located in the frame piece 2, at either side of the portion 8, are lug portions 14 and 16 which have pivotally supported therein a pair of shackle units 18 and 20 respectively. The opposite ends of the shackles are pivotally attached to bumper side sections 22 and 24 which in turn have attached therebetween at pivot points 21 and 23 a bumper center bar 26. Both the center bar 26 and the side sections 22 and 24 are of relatively heavy construction designed to withstand hard usage, and outer ends of the side sections are curved at 22a and 24a as shown to extend rearwardly around the respective ends of the frame piece 2 in a protectively arranged position.

Figure 4:
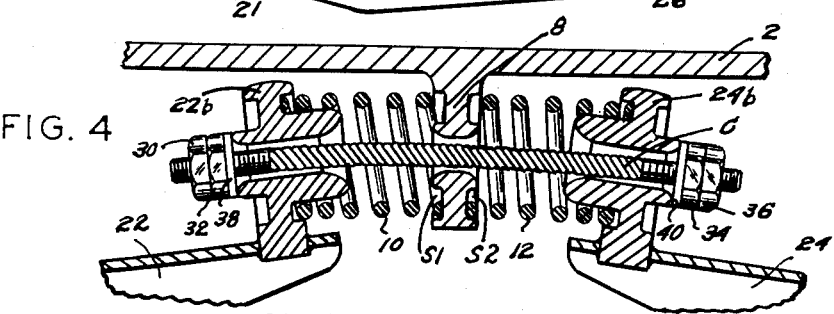
FIG. 4 is a plan cross-sectional view illustrating the dual spring mounting in more detail.
Figure 5:
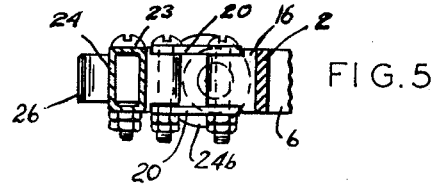
FIG. 5 is a vertical cross-section taken on the line 5—5 of FIG. 1.

At their inner extremities the side sections 22 and 24 are formed with spring engaging extensions 22b and 24b which are designed to fit around and retain respective ends of the springs 10 and 12 as is more clearly shown in FIG. 4. These extensions 22b and 24b are further held against the ends of the springs by means of a holding element consisting of a cord C located through the springs and the member 8, and nuts as 30, 32, 34 and 36 which are threaded over the cord ends against washers 38 and 40.

Figure 3:
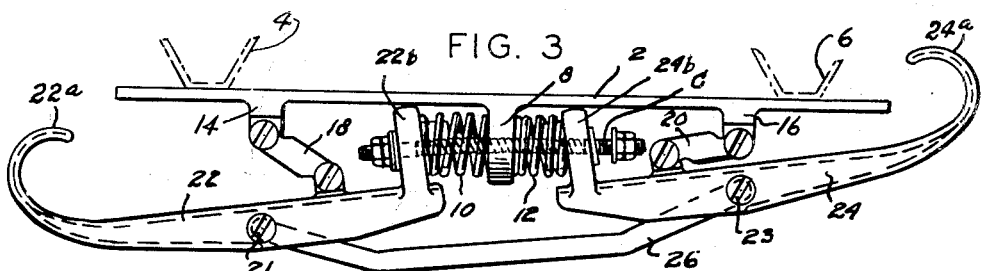
FIG. 3 is a plan view showing one component of the bumper construction in a compacted position.

The springs 10 and 12, in the position shown in FIGURE 1, are lightly compressed and in this normal compressed state, the bumper sections are pivoted on the pivoted members 21 and 23 so that the sections project outwardly at an angularly extending manner as noted in FIGURE 1. In this position, either of the bumper side sections 22 or 24, when contacted independently, may be forced inwardly against the resistance of a respective spring member. For example, the bumper section 24 is shown forced inwardly in FIGURE 3 without any change in the position of the side section 22. In this case, the force acting on the side section 24 is absorbed almost entirely by the spring 12.

Figure 2:
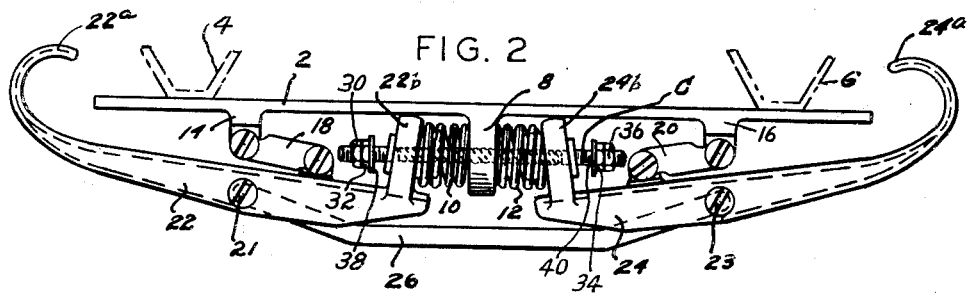
FIG. 2 is another plan view showing the bumper construction in a fully compacted position.

In FIGURE 2, the two bumper side sections 22 and 24 are shown, together with the center bar 26, in a compressed state resulting from a force acting directly on the center bar 26. In this case, the force is absorbed in a different manner since the force acts through both of the pivots 21 and 23, displacing these members inwardly and thereby simultaneously compressing each of the springs 10 and 12. In this type of displacement, a very large force can be absorbed with a very small displacement, since there is a relatively long lever action employed through which the impact force must act. It will be observed that the long lever action is derived from the particular arrangement of the center bar and side sections being pivotally connected as shown with each of the side sections pivoted on shackle members and with each of the side sections being engaged against the ends of the springs 10 and 12.

It will be apparent, therefore, that I have disclosed a unique and simplified bumper construction which is capable of absorbing very large forces in a very short displacement distance utilizing a single pair of springs and a minimum number of pivot points.

While I have shown a preferred arrangement of spring and bumper section mounting, it should be understood that various changes and modifications may be resorted to within the scope of the appended claims.

I claim:

1. An improved bumper construction comprising an elongated rigid frame piece having a longitudinal axis adapted to be supported at one end of an automobile above ground level and presenting a right angular central body portion having an opening therethrough, a pair of spring elements mounted in opposed relationship to one another against opposite sides of the central body portion in end to end relationship such that the axis of contraction and extension of the spring elements extends substantially parallel to the longitudinal axis of the frame piece, a pair of bumper side sections, respective side section shackle members pivotally attached to the frame piece, said shackle members extending angularly away from the frame piece and being pivotally attached to the bumper side sections to yieldably support the bumper side sections in spaced relation to the frame piece, a bumper central section having its opposite ends pivotally connected to each of the said bumper side sections at points in close proximity to the said shackle members, said pivoted bumper side sections further being constructed with right angularly disposed extensions for receiving outer ends of said springs and having openings formed therethrough, a holding element extending through each of the springs and the central body portion and the right angularly disposed extension, said holding element having opposite extremities thereof anchored through the right angularly disposed extensions of the bumper side sections, to secure the springs to respective side sections whereby the said side sections may be displaced against the resistance of the springs through only a limited arc of travel.

2. A structure according to claim 1 in which the spring elements consist of coiled springs and retaining member consists of a cord element.

References Cited in the file of this patent

UNITED STATES PATENTS

| | | |
|---|---|---|
| 1,412,047 | Dyer | Apr. 11, 1922 |
| 1,670,963 | Hart | May 27, 1928 |
| 1,726,191 | Peacock | Aug. 27, 1929 |
| 2,029,824 | LaPointe | Feb. 4, 1936 |

FOREIGN PATENTS

| | | |
|---|---|---|
| 665,795 | France | Mar. 27, 1928 |
| 134,251 | Switzerland | Sept. 16, 1929 |